US009438847B2

(12) United States Patent
Hara

(10) Patent No.: US 9,438,847 B2
(45) Date of Patent: Sep. 6, 2016

(54) INFORMATION PROCESSING DEVICE, CONTROL METHOD THEREOF, AND STORAGE MEDIUM

(71) Applicant: CANON KABUSHIKI KAISHA, Tokyo (JP)

(72) Inventor: Kenichiroh Hara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 299 days.

(21) Appl. No.: 13/939,336

(22) Filed: Jul. 11, 2013

(65) Prior Publication Data
US 2014/0028875 A1    Jan. 30, 2014

(30) Foreign Application Priority Data

Jul. 25, 2012   (JP) .................................. 2012-165141

(51) Int. Cl.
| | |
|---|---|
| *H04N 5/77* | (2006.01) |
| *H04N 9/804* | (2006.01) |
| *H04N 9/82* | (2006.01) |
| *H04N 5/232* | (2006.01) |

(52) U.S. Cl.
CPC ............ *H04N 5/77* (2013.01); *H04N 5/23206* (2013.01); *H04N 9/8047* (2013.01); *H04N 9/8233* (2013.01)

(58) Field of Classification Search
CPC .. H04N 5/23206; H04N 5/77; H04N 9/8047; H04N 9/8233
See application file for complete search history.

(56) References Cited

U.S. PATENT DOCUMENTS 5,940,119 A * 8/1999 Platte ..................... H04N 7/142
                                                    348/14.01
6,690,948 B1 * 2/2004 Takiguchi ............. H04W 28/18
                                                    455/426.2

(Continued)

FOREIGN PATENT DOCUMENTS

| JP | 2001-091290 | 4/2001 |
|---|---|---|
| JP | 2010-258593 A | 11/2010 |
| JP | 2011-077727 A | 4/2011 |

OTHER PUBLICATIONS

Japanese Official Action dated Mar. 18, 2016, issued in corresponding Japanese Patent Application No. 2012-165141.

*Primary Examiner* — Amy Hsu
(74) *Attorney, Agent, or Firm* — Fitzpatrick, Cella, Harper & Scinto

(57) ABSTRACT

An information processing device includes a position acquisition unit to acquire position information periodically. A generating unit generates log data by associating each of the position information with date and time information indicating a date and time at which the position information was acquired. A control unit controls processing for establishing a connection with an image capturing device, and transmitting position information included in the log data to the image capturing device, to add the position information to images recorded on the image capturing device. The control unit performs control so that position information acquired after a predetermined timing, out of position information acquired during connection with the image capturing device, is not transmitted to the image capturing device. The position acquisition unit acquires the plurality of position information before the connection with the image capturing device is established and while the connection with the image capturing device is established.

28 Claims, 10 Drawing Sheets

(56) References Cited

U.S. PATENT DOCUMENTS

| | | | | |
|---|---|---|---|---|
| 8,773,474 B2* | 7/2014 | Takakura | ............... | H04N 5/772 345/681 |
| 2002/0107033 A1* | 8/2002 | Kim | ............... | H01Q 1/241 455/456.6 |
| 2004/0036895 A1* | 2/2004 | Yano | ............... | H04N 1/00278 358/1.6 |
| 2006/0031682 A1* | 2/2006 | Sakai | ............... | H04N 7/147 713/182 |
| 2008/0174676 A1* | 7/2008 | Squilla | ............... | G06F 17/30056 348/231.6 |
| 2010/0128132 A1* | 5/2010 | Fukushima | ............... | H04N 1/00278 348/207.2 |
| 2010/0250115 A1* | 9/2010 | Ohata | ............... | G01C 21/367 701/533 |

* cited by examiner

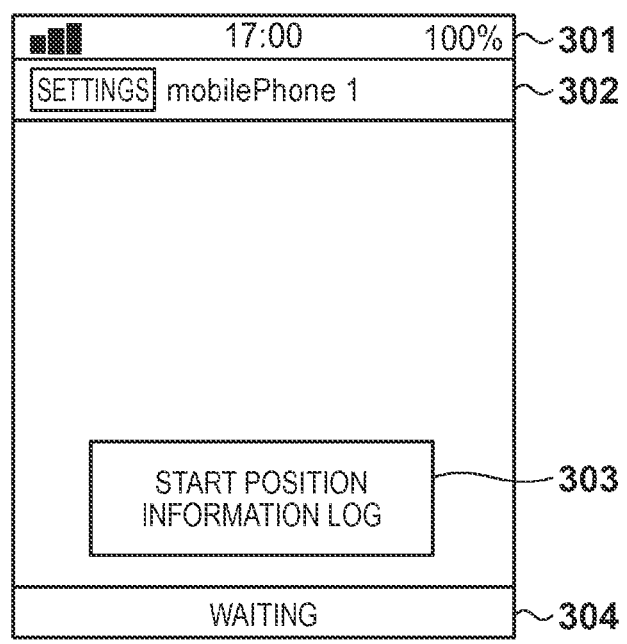
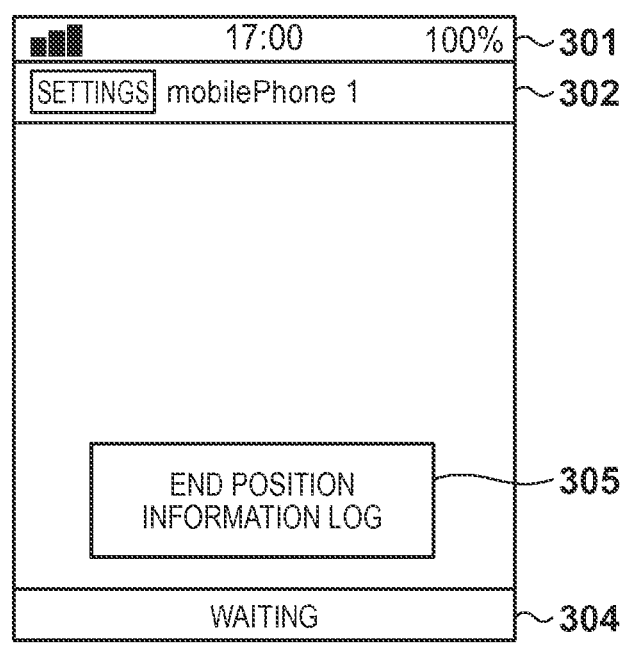

| | 601 | | 602 |
|---|---|---|---|
| img0001.jpg | 2012/06/03 09:30 | UTC+9 | ID1 |
| img0002.jpg | 2012/06/03 09:38 | UTC+9 | ID2 |
| img0003.jpg | 2012/06/05 08:32 | UTC+9 | ID3 |
| img0004.jpg | 2012/06/05 08:55 | UTC+9 | ID4 |
| img0005.jpg | 2012/06/05 09:21 | UTC+9 | ID5 |
| img0006.jpg | 2012/06/05 10:12 | UTC+9 | ID6 |
| img0007.jpg | 2012/06/05 10:15 | UTC+9 | ID7 |
| img0008.jpg | 2012/06/05 11:31 | UTC+9 | ID8 |
| img0009.jpg | 2012/06/05 17:56 | UTC+9 | ID9 |
| img0010.jpg | 2012/06/05 19:14 | UTC+9 | ID10 |

INFORMATION PROCESSING DEVICE, CONTROL METHOD THEREOF, AND STORAGE MEDIUM

CLAIM OF PRIORITY

This application claims the benefit of Japanese Patent Application No. 2012-165141, filed Jul. 25, 2012, which is hereby incorporated by reference herein in its entirety.

BACKGROUND OF THE INVENTION

1. Field of the Invention

The present invention relates to a technique that allows position information, at the time of image capture, to be assigned from outside to images held by an image capturing device.

2. Description of the Related Art

In recent years, addition of position information to images captured by an image capturing device, such as a digital camera, has been performed using log data generated by a GPS logger. For example, Japanese Patent Laid-Open No. 2001-91290 discloses a method according to which a PC adds position information to images by acquiring log data generated by a GPS logger, acquiring images generated by a digital camera, and matching the log data with the images based on respective generation dates and times.

In the '290 document referenced above, in order to add position information to images, log data and images initially need to be copied to a PC from different devices, requiring the user to carry out complex operations.

In view of this, the inventor of the present invention conceived to add position information to images by the digital camera and the GPS logger communicating directly, rather than via a PC. However, image capture and communication both generally impose a high processing load, and cannot readily be executed in parallel. Thus, it was considered preferable to inhibit image capture when the digital camera is communicating with the GPS logger. On the other hand, it is conceivably preferable to continue the acquisition of log data generated by the GPS logger, even when the GPS logger is communicating with the digital camera. This is because it is possible that the GPS logger is performing matching with another digital camera or that the log data is being used to indicate the movement trajectory of the GPS logger. This being the case, there will be no images to which to add position information acquired after the start of communication with the digital camera. Thus, it is inefficient to perform matching using all log data recorded on the GPS logger.

SUMMARY OF THE INVENTION

To resolve these issues, according to an aspect of this disclosure, an information processing device comprises a position acquisition unit configured to acquire a plurality of position information, a generating unit configured to generate log data by associating each of the plurality of position information with date and time information indicating a date and time at which the position information was acquired, and a control unit configured to control processing for establishing a connection with an image capturing device, transmitting position information included in the log data to the image capturing device, and adding the position information to images recorded on the image capturing device, wherein the control unit performs control so that position information acquired after a predetermined timing, out of position information acquired during connection with the image capturing device, is not transmitted to the image capturing device.

Further features of the present invention will become apparent from the following description of exemplary embodiments (with reference to the attached drawings).

BRIEF DESCRIPTION OF THE DRAWINGS

FIGS. 3A and 3B are diagrams showing examples of screens displayed on a display unit of the mobile phone according to the first embodiment.

DESCRIPTION OF THE EMBODIMENTS

Hereafter, embodiments according to the present invention will be described in detail in accordance with the accompanying drawings.

Note that the following embodiments are exemplary means for realizing the present invention, and may be modified or changed as appropriate, depending on the configuration and respective conditions of the device to which the invention is applied. The individual embodiments can also be combined as appropriate. Hereafter, an image capturing system that is constituted by a digital camera serving as an image processing device and a mobile phone serving as an information processing device will be described.

First Embodiment

Internal Configuration of Digital Camera 100

Figure 1:
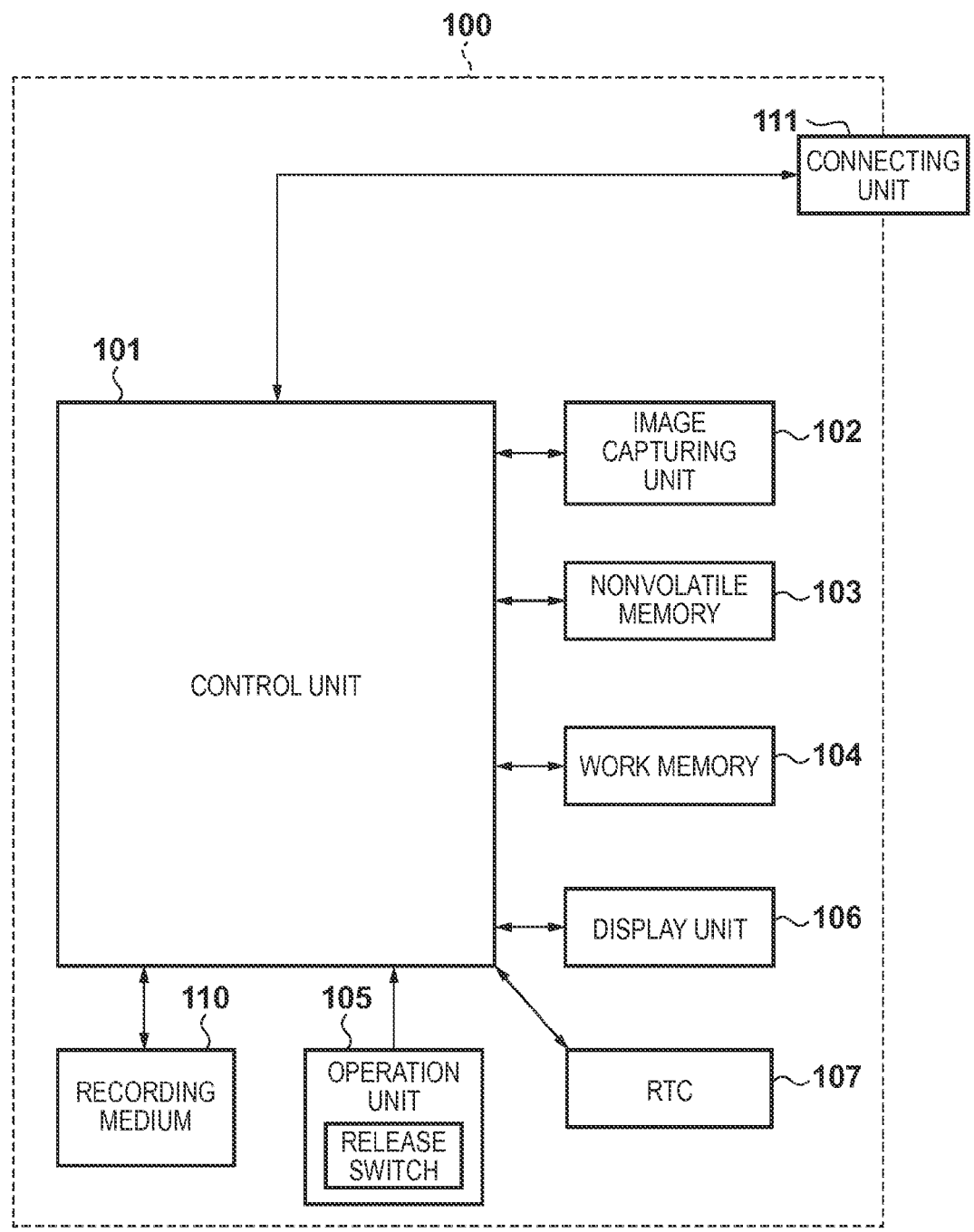
FIG. 1 is a block diagram of a digital camera according to a first embodiment.

FIG. 1 is a block diagram showing an exemplary configuration of a digital camera 100, which is an example of the image processing device according to the present embodiment. Note that although a digital camera is described here as an exemplary image processing device, the image processing device is not limited thereto. For example, any image processing device having an image capturing function and a communication interface for communicating with an external device may be used, examples of which include an information processing device such as a mobile phone, a tablet device or a personal computer, and an image capturing device, such as a mobile phone camera.

A control unit 101 controls the components of the digital camera 100 in accordance with input signals and programs discussed later. Note that overall control of the device may be performed by a plurality of pieces of hardware sharing the processing, rather than being performed by the control unit 101.

An image capturing unit 102 converts light from an object whose image is formed by a lens included in the image capturing unit 102 into electrical signals, performs processing such as noise reduction on the electrical signals, and outputs digital data as image data. After being stored in a buffer memory, the captured image data is subject to predetermined processing by the control unit 101, and is recorded to a recording medium 110.

A nonvolatile memory 103 is an electrically erasable/recordable nonvolatile memory, and stores programs discussed later that are executed by the control unit 101, and the like.

A work memory 104 is variously used as a buffer memory for temporarily holding image data captured by the image capturing unit 102, an image display memory of a display unit 106, and a work area of the control unit 101.

An operation unit 105 is used in order to receive instructions given by a user to the digital camera 100. The operation unit 105 includes operation members, such as a power button for the user to instruct power on/off of the digital camera 100, a release switch for instructing image capture, and a play button for instructing playback of image data. A touch panel (discussed later) that is formed on the display unit 106 is also included in the operation unit 105. Note that the release switch is a two-stage switch having switches SW1 and SW2. SW1 is turned on when the release switch is in a so-called half-pressed state. An instruction for performing preparatory processing for image capture such as autofocus (AF), automatic exposure (AE), automatic white balance (AWB), and electronic flash pre-emission (EF) is thereby received. SW2 is turned on when the release switch is in a so-called fully pressed state. An instruction for performing image capture is thereby received.

The display unit 106 variously performs display of a viewfinder image at the time of image capture, display of captured image data, and character display for interactive operations. Note that the digital camera 100 does not necessarily need to be provided with the display unit 106. The digital camera 100 need only be able to connect to the display unit 106 and have at least a display control function of controlling display on the display unit 106.

An RTC 107 is an internal clock and outputs date and time information indicating the date and time in response to a request from the control unit 101. The RTC 107 has an internal power supply and is able to continue the clocking operation even when the main power supply of the digital camera 100 is off.

The recording medium 110 is able to record image data output from the image capturing unit 102. The present embodiment describes an example in which images are handled in Exif-JPEG format. The recording medium 110 may be configured so as to detachable from the digital camera 100 or may be built into the digital camera 100. That is, the digital camera 100 need only have at least means for accessing the recording medium 110.

A connecting unit 111 is an interface for connecting to an external device. The digital camera 100 of the present embodiment is able to exchange data with an external device via the connecting unit 111. Note that, in the present embodiment, the connecting unit 111 is an antenna, and the control unit 101 is able to connect to an external device via the antenna. PTP/IP (Picture Transfer Protocol over Internet Protocol) for wireless LAN, for example, can be used as the data communication protocol. Note that communication with the digital camera 100 is not limited thereto. For example, the connecting unit 111 can include wireless communication modules, such as an infrared communication module, a Bluetooth (registered trademark) communication module, and a Wireless USB. Furthermore, a cable connection such as a USB cable, an HDMI cable, or an IEEE 1394 cable may also be employed.

Internal Configuration of Mobile Phone 200

Figure 2:
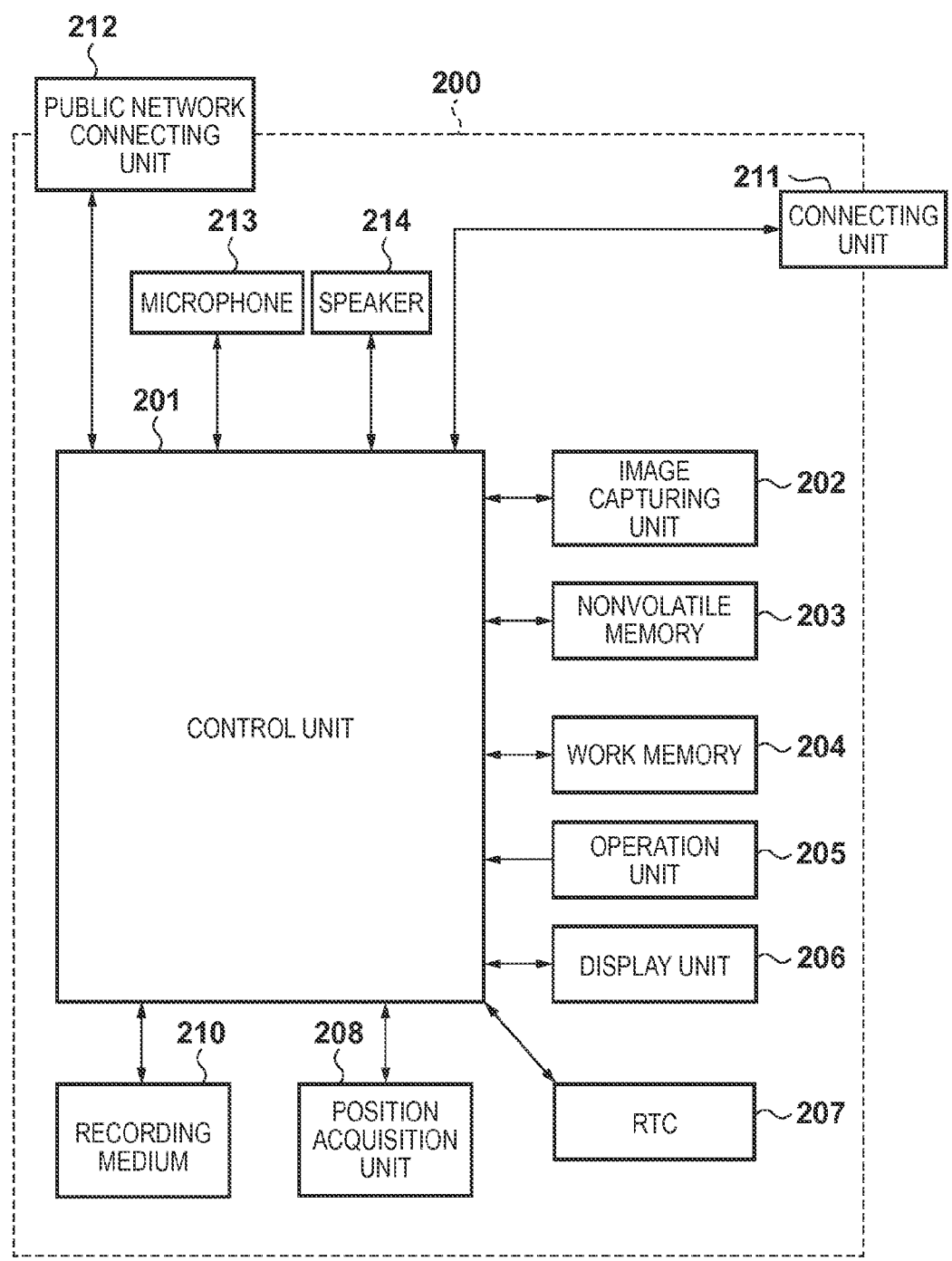
FIG. 2 is a block diagram of a mobile phone according to the first embodiment.

FIG. 2 is a block diagram showing an exemplary configuration of a mobile phone 200, which is an example of the information processing device that is used as a GPS logger according to the present embodiment. Note that, although a mobile phone is described here as an exemplary information processing device, the information processing device is not limited thereto. For example, the information processing device need only be a communication device having a position detection function and a communication function (wireless communication function in the embodiments) for communicating with an image processing device, and may be an electronic device, such as a digital camera, a tablet device, or a personal computer.

A control unit 201 is constituted by a processor (CPU), and controls the components of the mobile phone 200 in accordance with input signals and programs discussed later. Note that overall control of the device may be performed by a plurality of pieces of hardware sharing the processing, rather than being performed by the control unit 201.

An image capturing unit 202 converts light of an object whose image is formed by a lens included in the image capturing unit 202 into electrical signals, performs processing such as noise reduction on the electrical signals, and outputs digital data as image data. After being stored in a buffer memory, the captured image data is subject to predetermined arithmetic operations by the control unit 201, and is recorded to a recording medium 210.

A nonvolatile memory 203 is an electrically erasable/recordable nonvolatile memory, and stores programs (discussed later) that are executed by the control unit 201, and the like.

A work memory 204 is used as an image display memory of a display unit 206, a work area of the control unit 201, and the like.

An operation unit 205 is used in order to receive instructions given by a user to the mobile phone 200. The operation unit 205 includes operation members, such as a power button for a user to instruct power on/off of the mobile phone 200 and a touch panel that is formed on the display unit 206.

The display unit 206 performs display of image data, character display for interactive operation, and the like. Note that the mobile phone 200 does not necessarily need to be provided with the display unit 206. The mobile phone 200 need only be able to connect to the display unit 206 and have at least a display control function of controlling display on the display unit 206. An RTC 207 is an internal clock and outputs date and time information indicating the date and time in response to a request from the control unit 201.

A position acquisition unit 208 performs positioning processing in order to realize a position detection function. Positioning processing is processing that involves receiving a signal from a GPS satellite and computing position information indicating the position of the mobile phone 200 from the received signal. In the present embodiment, position information is represented by latitude and longitude coordinates. The position acquisition unit 208 also acquires date and time information indicating the date and time at which the position information was computed in the positioning processing. A specific acquisition method will now be described. Date and time information, known as GPS time, is included in the signal received from the GPS satellite. The GPS time included in the signal indicates the date and time at which the signal was output from the GPS satellite. Note that GPS time is synchronized to UTC (Universal Time Coordinated). Furthermore, information indicating the difference between GPS time and UTC is included in the signal received from the GPS satellite. The position acquisition unit 208 uses this information to compute UTC from GPS time. The position acquisition unit 208 thereby acquires UTC as date and time information indicating the date and time at which the position information was computed. This position information, and date and time information, is provided to the control unit 201 as needed. Note that, although the present embodiment describes an example using GPS as the position acquisition unit 208, the position acquisition unit 208 is not limited to GPS. For example, a device that acquires position information from an external device, such as a base station of the mobile phone may be used. Also, an acceleration sensor, or the like, may be used in the positioning processing.

The recording medium 210 is able to record image data output from the image capturing unit 202. The recording medium 210 may be configured so as to be detachable from the mobile phone 200 or may be built into the mobile phone 200. That is, the mobile phone 200 need only have at least means for accessing the recording medium 210.

A connecting unit 211 is an interface for connecting to an external device. The mobile phone 200 of the present embodiment is able to exchange data with the digital camera 100 via the connecting unit 211. In the present embodiment, the connecting unit 211 is an antenna, and the control unit 201 is able to connect to the digital camera 100 via the antenna. PTP/IP (Picture Transfer Protocol over Internet Protocol) for wireless LAN, for example, can be used as the data communication protocol. Note that communication with the mobile phone 200 is not limited thereto. For example, the connecting unit 211 can include wireless communication modules, such as an infrared communication module, a Bluetooth (registered trademark) communication module, and a Wireless USB. Furthermore, a cable connection, such as a USB cable, an HDMI cable, or an IEEE 1394 cable may also be employed.

A public network connecting unit 212 is an interface that is used when performing wireless communication over a public network. The mobile phone 200 is able to make a telephone call to another device via the public network connecting unit 212. At this time, the telephone call is realized by the control unit 201 inputting and outputting audio signals via a microphone 213 and a speaker 214. In the present embodiment, the public network connecting unit 212 is an antenna, and the control unit 201 is able to connect to a public network via the antenna. Note that, when wireless communication is employed in communication by the connecting unit 211, the connecting unit 211 and the public network connecting unit 212 are both able to use the one antenna.

Log Data Files Generated by Mobile Phone 200

Next, log data files generated by the mobile phone 200 will be described. It is assumed that, in the mobile phone 200 of the present embodiment, an application (hereafter, log application) for generating log data files has been installed on the recording medium 210. Log data files are generated by executing this log application.

FIG. 3A is an example of a screen that is displayed on the display unit 206 of the mobile phone 200 during execution of the log application. This screen 300 is displayed on the display unit 206 in response to operation of the log application being started. Also, in the example in FIG. 3A, the mobile phone 200 has not yet connected to the digital camera 100. Thus, a message 304 indicating that the mobile phone 200 is not connected to the digital camera 100 is displayed. In FIG. 3A, a bar 301 displays information such as the signal quality on the communication network over which the mobile phone 200 is able to connect, the time, and the battery charge. Also, a button 303 is for starting log data file generation. The user is able to input an instruction to start log data file generation by selecting the button 303 via the operation unit 205. While this log data file generation is being executed, a button 305 is displayed, instead of the button 303, as shown in FIG. 3B. The button 305 is a button for ending log data file generation. The user is able to input an instruction to end log data file generation by selecting the button 305 via the operation unit 205. Log data file generation will be described in detail later.

Figure 4:
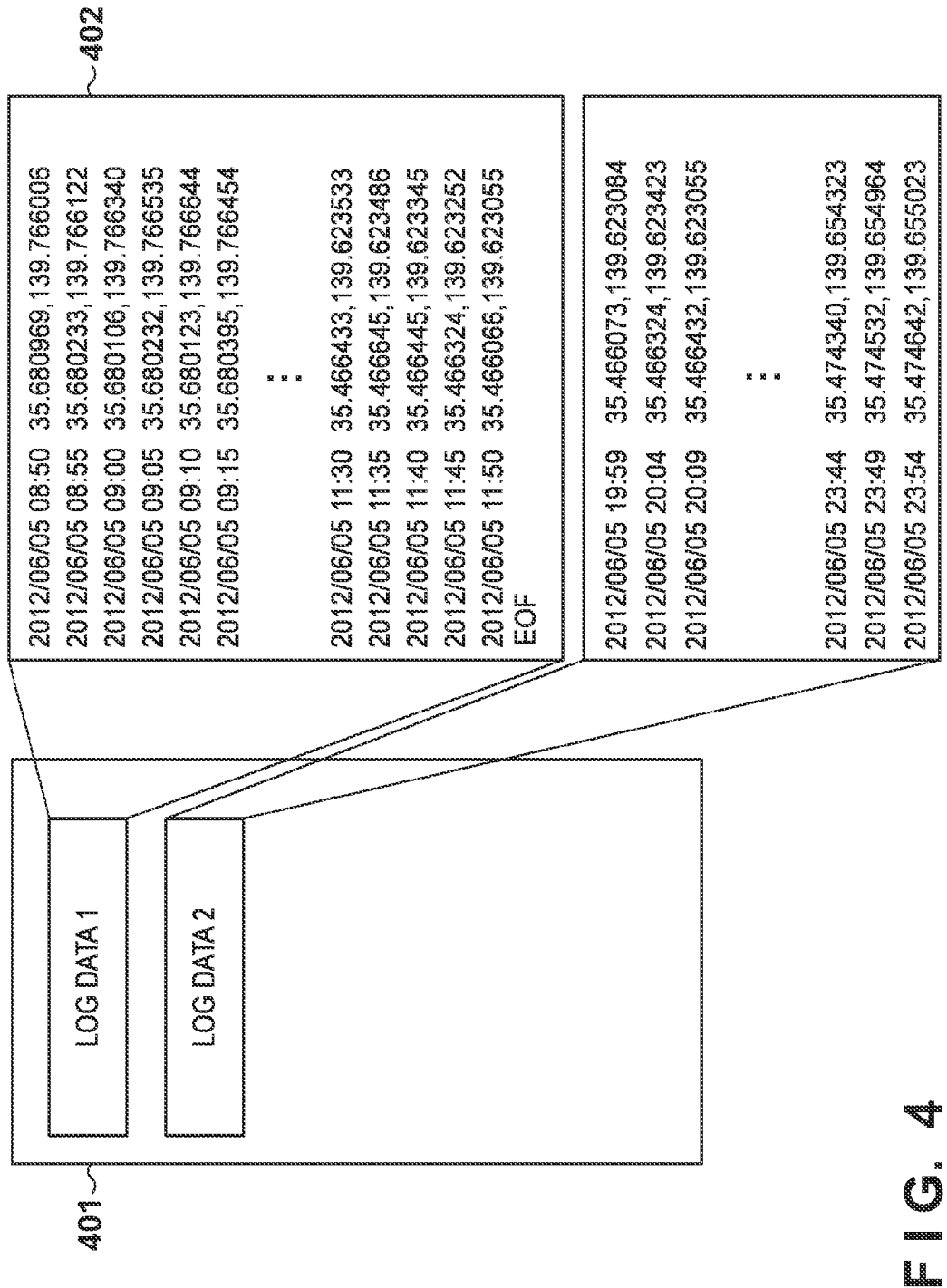
FIG. 4 is a conceptual diagram of log data.

FIG. 4 shows an example of a log data file generated by the mobile phone 200 in which position information is recorded along a time axis. In the example in FIG. 4, position information, and date and time information, have been recorded as log data at five minute intervals. Two log data files are secured and recorded in a portion 401 of the recording area of the recording medium 210. Reference sign 402 in FIG. 4 denotes exemplary log data description of the log data files. For example, the user inputs an instruction to start log data file generation at a position of latitude 35.680969 and longitude 139.766006 at 8:50. The user then inputs an instruction to temporarily end log data file generation at a position of latitude 35.466066 and longitude 139.623055 at 11:50. The user then inputs an instruction to start log data file generation again at 19:59. The current time is 23:55 and a log data file is being recorded (open state for adding log data). As a result of the user performing such operations, a log data file 1 and a log data file 2 will be generated, as shown in FIG. 4. A character string "EOF" showing that the file is closed is recorded at the end of the log data file 1. On the other hand, this character string does not appear in the log data file 2. In other words, it is shown that the log data file 2 is not closed (open state) and that current position information is periodically added thereto. Note that FIG. 4 is a conceptual diagram for illustrative purposes, and log data files may be recorded in a format including information other than position information, and date and time information. For example, the log data file may be recorded in a form compliant with the National Marine Electronics Association (NMEA) format. Also, the method of generating log data files is not limited to the above method. For example, a method may be adopted in which position information, and date and time information, are added when the device has moved a predetermined distance or more after log data was last added, rather than adding log data at a fixed time interval. In this case, since new position information, and date and time information, are not added if the device does not move, the size of log data files can be suppressed. Also, although the present embodiment describes an example in which position information is given in latitude and longitude, direction information or accuracy-related information (e.g., number of satellites used in positioning, etc.) may be included. The data structure of log data files according to the embodiments has been described above.

Image Generation in Digital Camera 100

Figure 5:
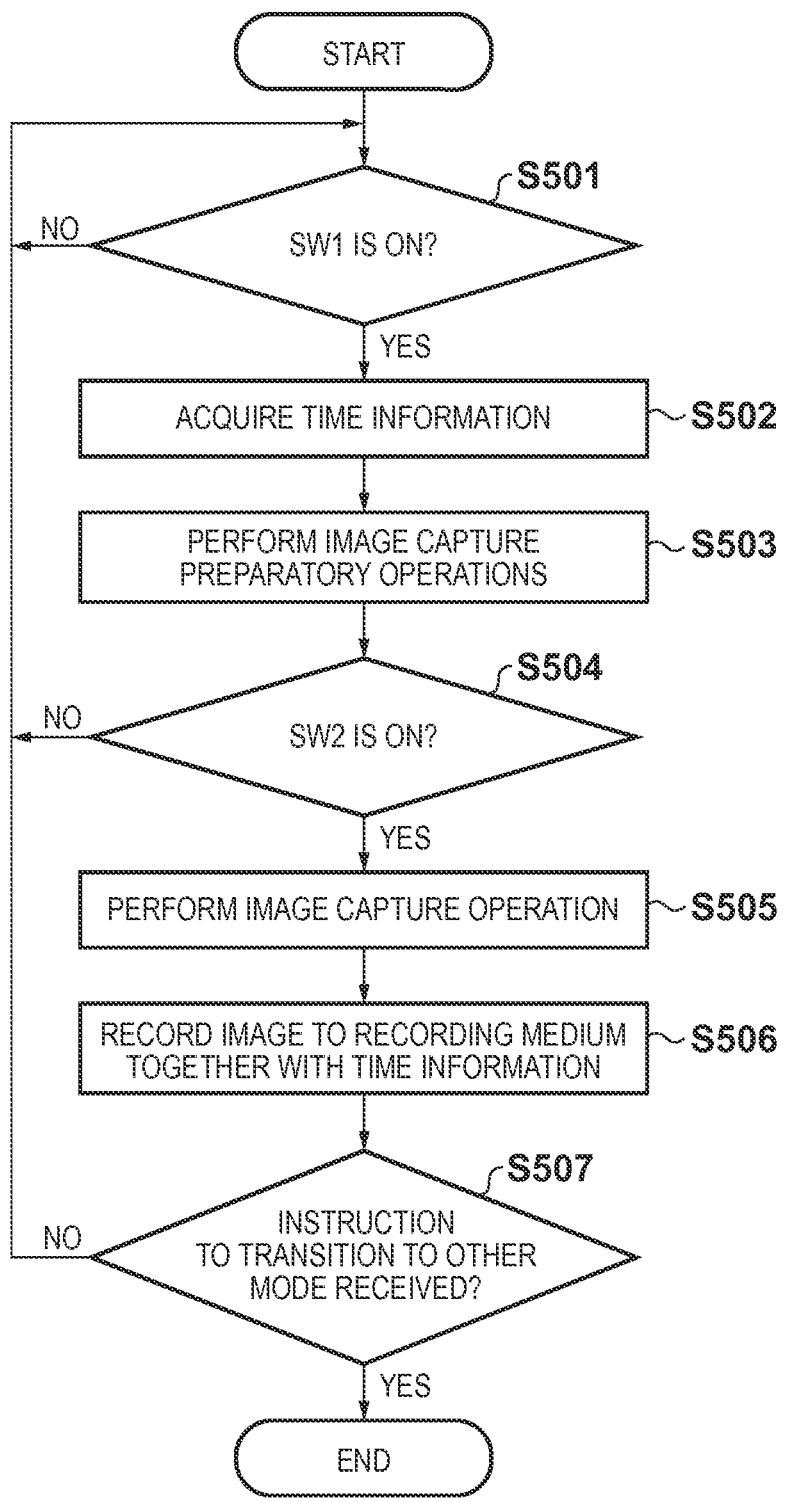
FIG. 5 is a flowchart showing operations of the digital camera at the time of an image generation.

Next, image capture processing (image generation processing) in the digital camera 100 according to the embodiments will be described using FIG. 5. FIG. 5 is a flowchart showing operations of the digital camera 100 at the time of generating an image. The processing shown in this flowchart is started in response to the camera 100 being powered on. Note that, in this state, a through-the-lens image input from the image capturing unit 102 is displayed on the display unit 106, and the user is able to perform image capture while checking the image shown on the display unit 106.

First, at step S501, the control unit 101 judges whether SW1 of the release switch included in the operation unit 105 is on. If it is judged that SW1 is not on, the processing of this step is repeated. On the other hand, if it is judged that SW1 is on, the processing proceeds to step S502.

At step S502, the control unit 101 acquires date and time information from the RTC 107. At step S503, the control unit 101 controls the image capturing unit 102 to perform image capture preparatory operations.

Next, at step S504, the control unit 101 judges whether switch SW2 is on. If it is judged that switch SW2 is not on, the processing returns to step S501. On the other hand, if it is judged that switch SW2 is on, the processing proceeds to step S505.

At step S505, the control unit 101 performs an image capture operation using the image capturing unit 102, and acquires an image. At the following step, step S506, the control unit 101 records the image acquired at step S504 to the recording medium 110 together with the date and time information acquired at step S502. At this time, the date and time information recorded together with the image is recorded to a header of the image as the image capture date and time of the image. The control unit 101 also records time difference information to the header of the image at this time.

Figures 6, 7:
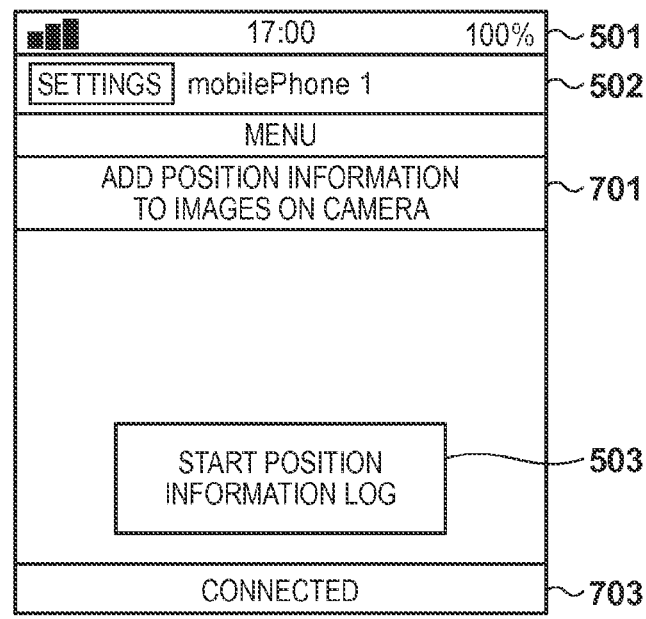
FIG. 6 is a conceptual diagram of image recording.
FIG. 7 is a diagram showing an example of a screen displayed on the display unit of the mobile phone according to the first embodiment.

The time difference information will now be described. A time zone can be set in the digital camera 100 of the present embodiment. A time zone is a region utilizing a common local standard time, and the user is able to preset time difference information indicating the time difference from Coordinated Universal Time (UTC) by setting a time zone through a menu operation, or the like. For example, in Japan, a date and time that is nine hours ahead of UTC is used as local standard time, and this time zone is represented as "UTC+9". The information "UTC+9" is added as time difference information to images obtained when the time zone is set to Japan. In the digital camera 100 of the present embodiment, the date and time information output by the RTC 107 is treated as a time zone-adjusted time that has been preset by a menu operation, or the like, of the user. In other words, the control unit 101 treats the output of the RTC 107 as information indicating a time zone-adjusted local standard time. Accordingly, UTC can be computed by subtracting the value shown by the time difference information from the output of the RTC 107. Use of UTC will be described in detail when the addition of position information to an image is discussed later. Also, the time difference information is recorded to a so-called "MakerNote" section in the header. A portion of the recording area of the recording medium 110 to which images are recorded as a result of the processing of this step is shown in FIG. 6. In FIG. 6, ten captured images are recorded in the recording area 601 together with the image capture date and time, and time difference information. Also, in the present embodiment, the control unit 101 allocates a management ID to each of the image files recorded on the recording medium 110. These IDs are temporarily held in the work memory 104 rather than the recording medium 110, and the images recorded on the recording medium 110 are scanned as a result of the digital camera 100 being powered on, and a unique value is allocated to each image. Then, whenever a captured image is newly recorded in this step, a corresponding ID will be allocated to the newly recorded image. FIG. 6 shows a state in which ID1 to ID10 that are allocated sequentially starting from img0001.jpg are recorded to a portion 602 of the recording area of the work memory 104.

At step S507, the control unit 101 judges whether an instruction to transition to another mode has been received. For example, in the case when it is detected that the play button included in the operation unit 105 has been pressed, it is judged that an instruction to transition to playback mode has been received. If it is judged that an instruction to transition to another mode has not been received, the processing returns to step S501. On the other hand, if it is judged that an instruction to transition to another mode has been received, the processing is ended. Image generation processing in the digital camera 100 according to the embodiments has been described above.

Addition of Position Information to Images

Next, processing for adding position information to images generated by the abovementioned digital camera 100 using log data files generated by the mobile phone 200 will be described.

First, prior to this processing, the digital camera 100 and the mobile phone 200 connect via the connecting unit 111 and the connecting unit 211, and start communication with each other. The following processing is executed in the case when each device judges that communication with the other device has been established at the application level.

In the present embodiment, the mobile phone 200 has an application for establishing communication with the digital camera 100, and the mobile phone 200 is able to establish communication with the digital camera 100 as a result of the operation of this application. In establishing communication, the application of the mobile phone 200 waits for a connection request from the digital camera 100. When a connection request from the digital camera 100 is received, communication between the mobile phone 200 and the digital camera 100 at the application level is established by the application transmitting connection permission in response to the request.

An example of a screen displayed on the display unit 206 of the mobile phone 200 when communication has been established is shown in FIG. 7. On the screen in FIG. 7, a message 703 indicating that the mobile phone 200 is connected to the digital camera 100 is displayed. Also, a button 503 is for inputting an instruction to generate a log data file. The user is able to input an instruction to start log data file generation by selecting this button 503 via the operation unit 205. Also, a button 701 is for executing an operation for adding position information to images on the connected digital camera 100. This button 701 is displayed only while the digital camera 100 and the mobile phone 200 are connected. The user is able to input an instruction to start the processing for adding position information to images recorded on the recording medium 110 of the digital camera 100 by selecting this button 701 via the operation unit 205. An overview of the processing for adding position information that is started by receiving input of this instruction will be described.

Figure 8:
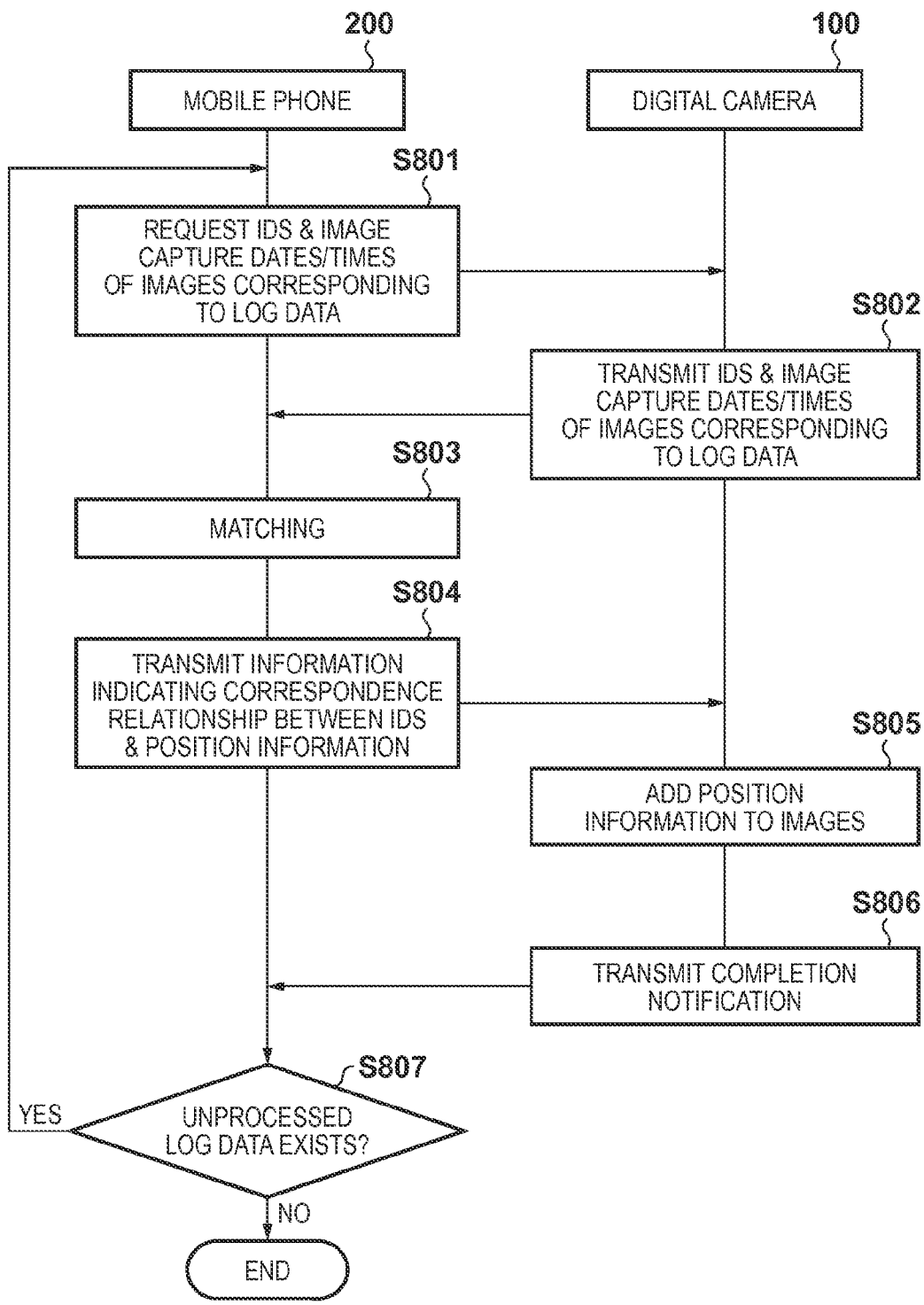
FIG. 8 is a sequence diagram showing the addition of positions to images through cooperation between the mobile phone and the camera.

FIG. 8 is a sequence diagram for illustrating an overview of the above processing. The processing of the digital camera 100 in FIG. 8 is realized by the control unit 101 of the digital camera 100 executing a program recorded in the nonvolatile memory 103 and controlling the components of the digital camera 100 in accordance with the program. Also, the processing of the mobile phone 200 in FIG. 8 is realized by the control unit 201 of the mobile phone 200 executing a program recorded in the nonvolatile memory 203 and controlling the components of the mobile phone 200 in accordance with the program. Note that the processing in FIG. 8 is started by an instruction to start the processing for adding position information to images recorded on the recording medium 110 of the digital camera 100 being received via the operation unit 205 of the mobile phone 200.

First, at step S801, the mobile phone 200 sends a request for the IDs and the image capture dates and times of images corresponding to the recording period of a log data file to the digital camera 100. Specifically, the IDs and the image capture dates and times of images, whose image capture dates and times are included within the span of time determined by the start date and time, and the end date and time of the log data file recorded on the recording medium 210 of the mobile phone 200, are requested. Note that only closed log data files are used here. This is because it is necessary to avoid overlapping access, since the mobile phone 200 continuously acquires position information even during communication with the digital camera 100, and adds the acquired position information to an open log data file. That is, in the case when log data files are recorded as shown in FIG. 4, the log data file 2 is not used. In the example shown in FIG. 4, the IDs and the image capture dates and times of images that were captured from 8:50 to 11:50 on Jun. 5, 2012, are requested. Note that the recording period of log data is represented in UTC as mentioned above.

At step S802, the digital camera 100, having received this request, reads out the images corresponding to the request from the recording medium 110, and transmits the IDs and the image capture dates and times of those images to the mobile phone 200. As mentioned above, the recording period of log data is represented in UTC. Thus, image capture dates and times using the output of the RTC 107 showing the local standard time cannot be correctly compared. In view of this, the digital camera 100 determines the images corresponding to the request, after having converted the image capture dates and times of the images to UTC. Conversion of image capture dates and times to UTC is performed using the time difference information recorded for each image, as illustrated in FIG. 5. For example, in the case when a request based on the log data of FIG. 4 is received, the image capture dates and times of the images shown in FIG. 6 are first converted to UTC. A date and time that is nine hours behind the image capture date and time of each image will thereby be UTC. For example, the image capture date and time of img0009.jpg is converted from 17:56 to 8:56. It is then judged whether the image capture dates and times converted to UTC correspond to the request. As a result, the IDs and the image capture dates and times converted to UTC of img0009.jpg and img0010.jpg whose converted image capture dates and times are included within the requested recording period of the log data will be transmitted to the mobile phone 200. Note that the IDs, and the image capture dates and times of images whose position information is already recorded, are not transmitted. That is, images to which position information has already been added are not subject to position information addition processing. This prevents position information from being overwritten.

When the mobile phone 200 receives the IDs and the image capture dates and times of the images corresponding to the recording period of the log data file from the digital camera 100, the processing proceeds to step S803. At this step S803, the mobile phone 200 performs matching processing with this time-related information as a key. Here, the date and time information of the log data file and the image capture dates and times are compared, and the respective differences in date and time are derived. The position information of the log data and the ID of the image of the combination having the smallest difference, among the combinations whose difference is at or below a given threshold, are then associated with each other. A set in which the ID of an image and the position information of log data are associated will thereby be generated. This processing is executed on all received IDs of images. As a result, a plurality of sets of IDs and position information are generated. For example, information indicating the position of latitude 35.680233 and longitude 139.766122 acquired as position information at 8:55 is associated with ID9 of img0009.jpg. As a result, ID9 and the information indicating and the position of latitude 35.680233 and longitude 139.766122 form one set. Note that, although matching in the present embodiment was described with an example in which priority is given to combinations with a small difference in date and time, the present invention is not limited thereto. For example, priority may be given to the combination whose date and time information has the smallest difference in date and time, among the date and time information indicating earlier dates and times, than the image capture date and time. Alternatively, priority may be given to the combination whose date and time information has the smallest difference in date and time, among date and time information indicating later dates and times than the image capture date and time.

Once matching processing has been performed on all IDs of images received from the digital camera 100, the mobile phone 200, at step S804, then transmits (returns) the sets generated at step S803 to the digital camera 100.

On receipt of these sets, the digital camera 100, at step S805, adds the position information of the sets to the position information area of the image files corresponding to the IDs as attribute information. For example, the information indicating the position of latitude 35.680969 and longitude 139.766006, which is the position information corresponding to ID9, is added to img0009.jpg.

When the processing of step S805 is completed, the digital camera 100, at step S806, transmits a completion notification, indicating that addition of position information has been completed, to the mobile phone 200.

At step S807, the mobile phone 200, having received the completion notification, checks whether there is a log data file that has not yet been used in the addition of position information. If there is a log data file that has not been used, the procedure from step S801 is repeated using the log data of this log data file.

The above was an overview of the processing for adding position information to images generated by the abovementioned digital camera 100, using log data files generated by the mobile phone 200. For example, if the user is walking around with both the digital camera 100 and the mobile phone 200, it is highly likely that at least the image capture positions of images generated as a result of image capture performed by the digital camera 100 will be included in log data acquired by the mobile phone 200. Thus, the abovementioned processing enables appropriate image capture positions to be added to images using log data.

Generation of Log Data

Next, generation of log data files, which is one of the characteristic functions of the mobile phone 200 of the present embodiment, will be described.

As mentioned above, in the mobile phone 200 of the present embodiment, a log application is preinstalled on the recording medium 210, and log data files are generated by executing this log application. The log application of the present embodiment generates log data files suitable for the abovementioned addition of position information to images.

Figure 9:
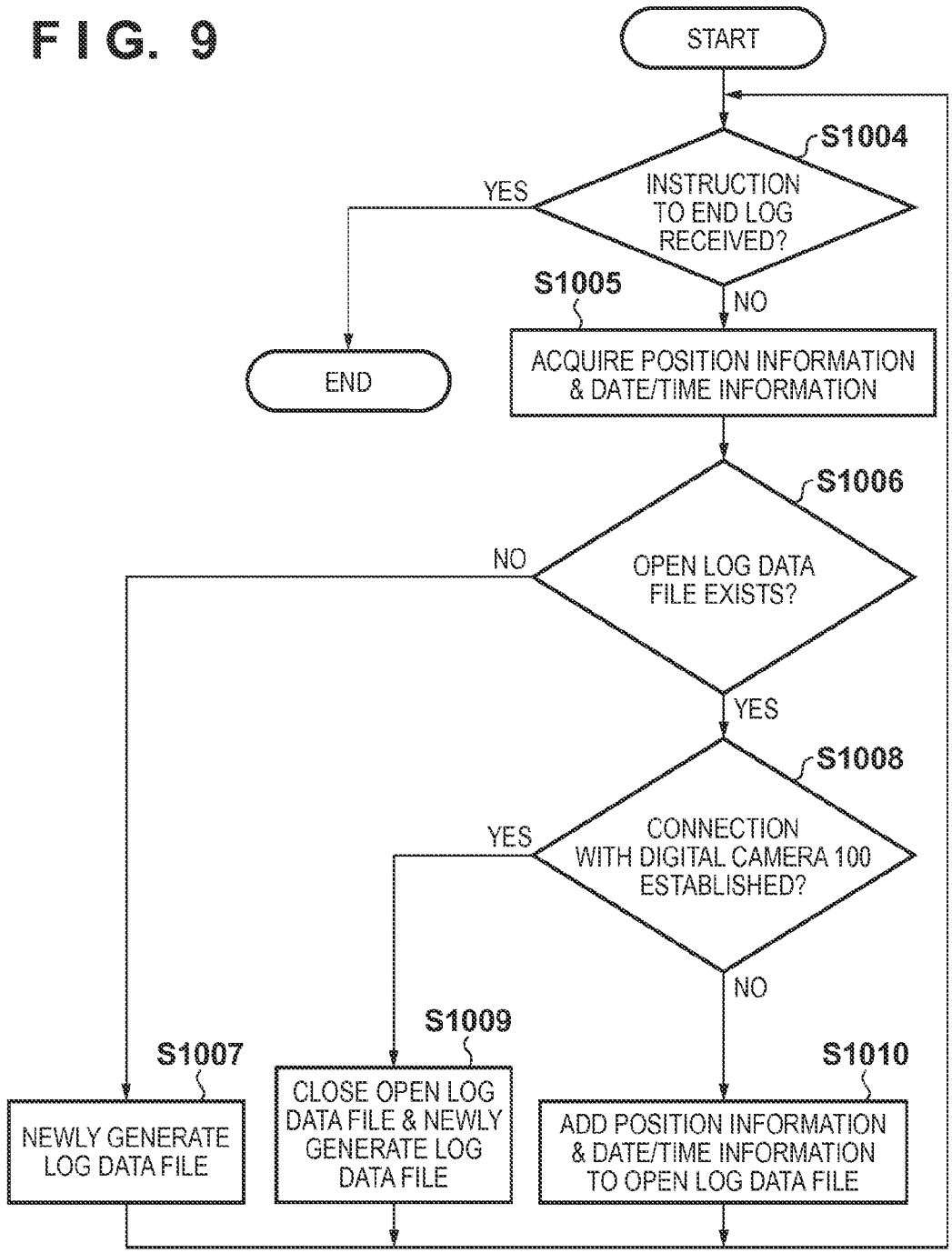
FIG. 9 is a flowchart of log generation in the mobile phone according to the first embodiment.

FIG. 9 is a flowchart showing operation of the mobile phone 200 at the time of generating log data files. The processing shown in this flowchart is realized by the control unit 201 of the mobile phone 200 executing a program recorded in the nonvolatile memory 203 and controlling the components of the mobile phone 200 in accordance with the program. This similarly applies to subsequent flowcharts executed by the mobile phone 200. Also, the processing shown in this flowchart is started in response to the control unit 201 having received an instruction to start log data file generation through selection of the button 503 in FIG. 7 or the button 303 in FIG. 3A, for example.

First, at step S1004, the control unit 201 judges whether an instruction to end log data file generation has been received. As mentioned above, the user is able to input an instruction to end log data file generation through selection of the button 305 in FIG. 3B. The control unit 201, in the case of judging that an instruction to end log data file generation has been received, ends the processing of this flowchart. The control unit 201, in the case of judging that an instruction to end log data file generation has not been received, proceeds to step S1005.

At step S1005, the control unit 201 controls the position acquisition unit 208 to acquire position information, and date and time information.

At the following step, step S1006, the control unit 201 judges whether the recording medium 210 has a log data file that is in an open state for adding log data. If it is judged that there is not an open log data file in the recording medium 210, the control unit 201 advances the processing to step S1007. This will be the case if there are only closed log data files or if there are no log data files recorded.

At step S1007, a log data file is newly generated (opened), and the position information, and the date and time information acquired at step S1005 are added to that file. In other words, the position information and the date and time information acquired at step S1005 are recorded as a new log data file that is different from the log data file(s) already recorded. Even if a connection with a camera is established at this timing, the new log data file generated here is not used in requesting image IDs, since the file is not closed. Thus, the judgment of step S1008 discussed later does not need to be performed.

On the other hand, in the case when the control unit 201 judges that there is a log data file in an open state on the recording medium 210, the processing proceeds to step S1008.

At step S1008, the control unit 201 judges whether the mobile telephone 200 has changed from a state where a connection with a digital camera 100 is not established to a state where a connection with a digital camera 100 is established. Specifically, the control unit 201 judges whether connection permission has been transmitted to a digital camera 100 that has transmitted a connection request to the mobile phone 200. If connection permission has been transmitted, it is judged that the mobile phone 200 has changed from a state where a connection with a digital camera 100 is not established to a state where a connection is established. This will be the case if a connection with a digital camera 100 is established during log data file generation. On the other hand, if connection permission has not been transmitted, it is judged that the mobile phone 200 has not changed from a state where a connection with a digital camera 100 is not established to a state where a connection is established. This will be the case if the mobile phone 200 is not connected or is already connected a digital camera 100, for example.

As mentioned above, log data file generation can be executed in parallel to communication with a digital camera 100. Thus, processing for establishing a connection with a digital camera 100 can be performed even during generation of a log data file.

If the control unit 201 judges that communication with a digital camera 100 has been established, the processing proceeds to step S1009.

At step S1009, the log data file that was open for adding log data is closed, and a log data file is newly generated (opened). In other words, the position information, and the date and time information acquired at step S1005 are recorded as a new log data file that is different from the log data file(s) already recorded. As illustrated in FIG. 8, a log data file in an open state is not used in requesting image IDs. That is, a log data file that has been newly created (opened) is not used in requesting image IDs. Therefore, the log data file in which position information acquired up until establishment of a connection was recorded is closed, and the position information acquired subsequent to establishment of a connection is recorded in a new log data file. Also, keeping this new log data file open prevents position information acquired subsequent to establishment of a connection (i.e., position information acquired in a period during which there is no possibility of images targeted for addition processing being generated) from being used in matching. Efficient matching can thereby be realized.

On the other hand, if the control unit 201 judges, at step S1008, that a connection with a digital camera 100 has not been established, the processing proceeds to step S1010.

At step S1010, the control unit 201 maintains the open state of the open log data file for adding log data, and adds the position information, and the date and time information acquired at step S1005 to this log data file. Thereafter, the processing returns to step S1004. The above was a description of processing for generating log data files according to the present embodiment.

As described above, in the present embodiment, the log data file that was being recorded (open state) is closed, in the case when the mobile phone 200 establishes communication with the digital camera 100. Since it is thereby possible to prevent position information acquired in a period during which images are not generated from being used in matching, more efficient matching can be performed.

Second Embodiment

A second embodiment describes the case when a function of using a mobile phone to view/acquire images recorded on a recording medium of a camera in the case when the mobile phone is communicating with the camera is provided, in addition to the function of adding positions to images using log data files. In this case, it is also conceivable that the purpose for connecting to the camera is to view or to acquire images, rather than to add position information. In such a case, it is not necessary to partition the log data files. In view of this, the second embodiment describes the case when log data files are closed at the timing at which an instruction to transition to matching processing is received, rather than at the timing at which a connection is established with the digital camera 100. Note that, in the present embodiment, a description of portions that are in common with the first embodiment is omitted, and the description will focus on portions that are particular to the second embodiment.

Figure 10:
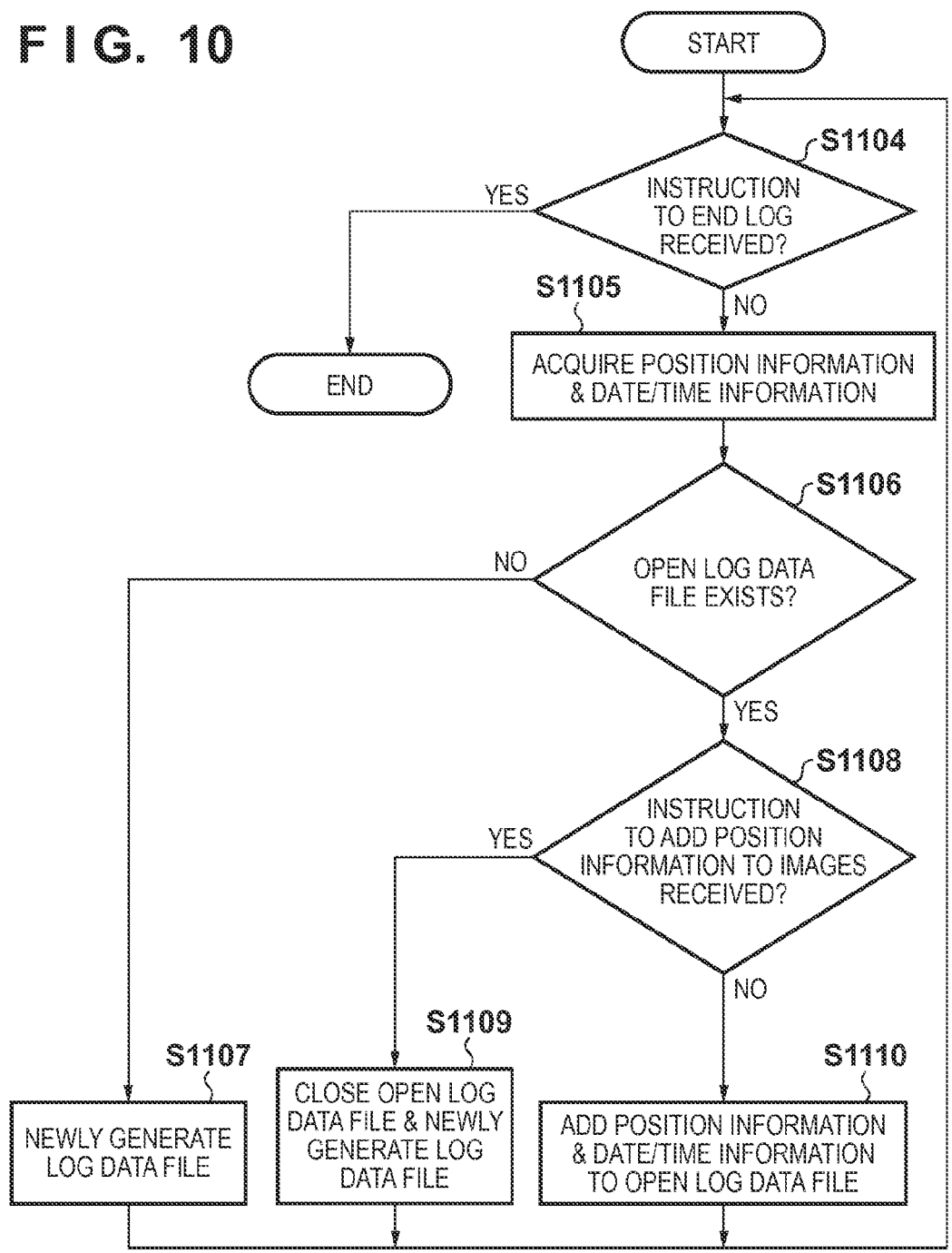
FIG. 10 is a flowchart of log generation in the mobile phone according to a second embodiment.

FIG. 10 is a flowchart showing operations of the mobile phone 200 of the present embodiment. Since the processing of steps S1104 to S1107 and steps S1109 and S1110 (excluding step S1108) is similar to steps S1004 to S1007 and steps S1009 and S1010 in FIG. 9, a description is omitted.

At step S1108, the control unit 201 judges whether an instruction to add position information to images has been received from the user via the operation unit 205. As mentioned above, generation of log data files can be performed in parallel to communication with the digital camera 100. Thus, processing for adding position information to images can be performed even during generation of log data files. If the control unit 201 judges that such an instruction has been received, the processing proceeds to step S1109.

As described above, in the mobile phone 200 of the second embodiment, log data files are closed at the timing at which an instruction to perform matching is received. Unnecessary partitioning of log data files, such as in the case when communication is disconnected without adding position information, even though communication with the digital camera 100 has been established, for example, is thereby eliminated. This is favorable in a system in which functions other than addition of position information can be used through communication between the mobile phone 200 and the digital camera 100, for example.

Third Embodiment

The first and second embodiments were premised on the case of a digital camera not being able to perform image capture during communication. In contrast, the third embodiment is described assuming that there are also digital cameras capable of performing image capture even during communication. For example, in the case when the digital camera is provided with a function of remote image capture by mobile phone or when the camera is a high-end camera that is able to execute image capture and communication in parallel, there could possibly be images to which position information acquired during connection should be added. This position information is at least no longer position information acquired in a period during which images are not generated. Accordingly, in the third embodiment, it is discriminated whether the connected camera is equipped with a function enabling image generation during communication. If the digital camera is not capable of generating images during communication, logs are partitioned similarly to the first embodiment, and if the digital camera is capable of generating images during communication, logs are not partitioned.

Figure 11:
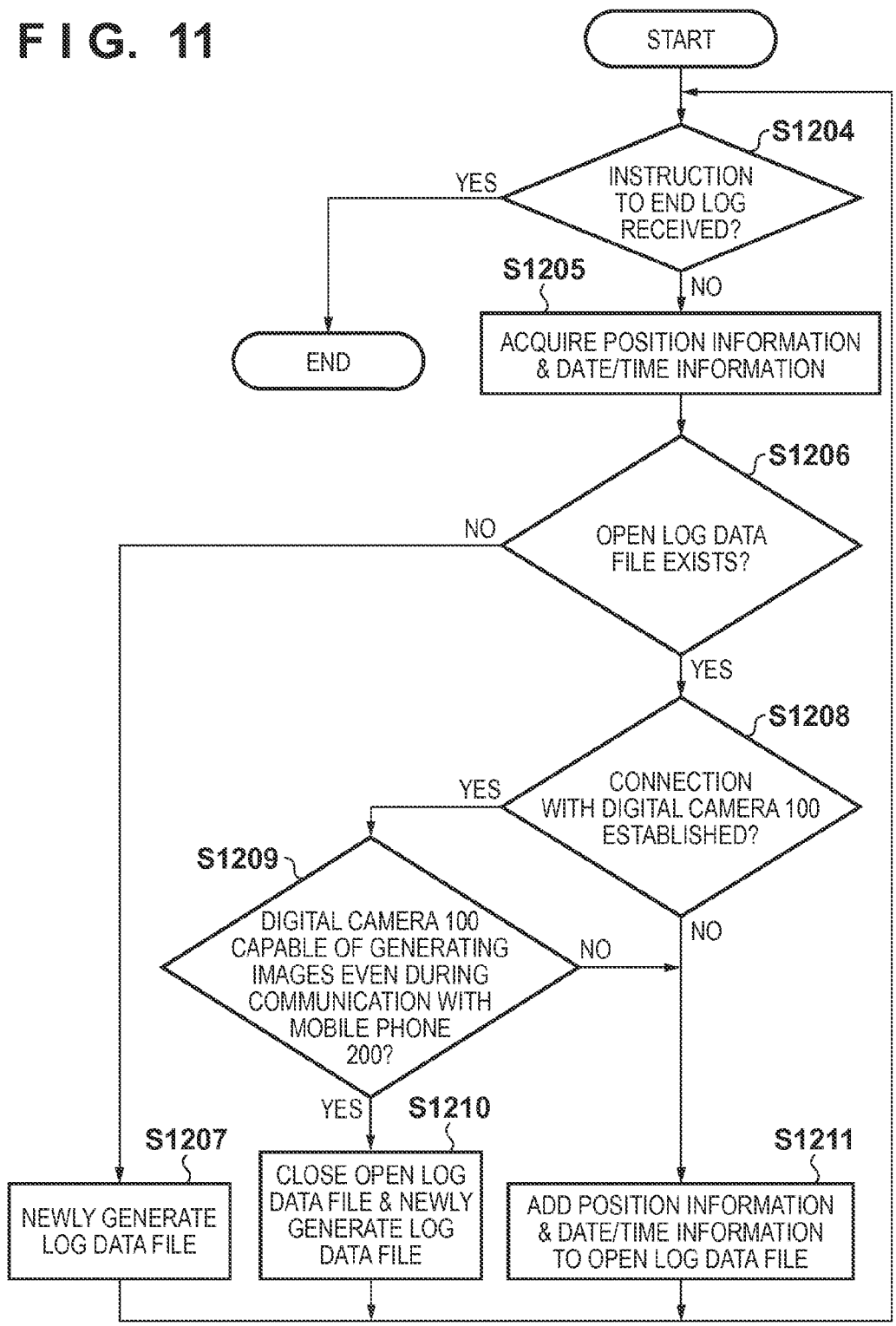
FIG. 11 is a flowchart of log generation in the mobile phone according to a third embodiment.

FIG. 11 is a flowchart showing operations of the mobile phone 200 of the present embodiment.

Since the processing of steps S1204 to S1207 is the same as the processing in steps S1004 to S1007 shown in FIG. 9, a description thereof is omitted.

At step S1208, the control unit 201 judges whether the mobile phone 200 is communicating with a digital camera 100. If the control unit 201 judges that the mobile phone 200 is communicating with a digital camera 100, the processing proceeds to step S1209. If the control unit 201 judges that the mobile phone 200 is not communicating with a digital camera 100, the processing proceeds to step S1211.

At step S1209, the control unit 201 discriminates whether the connected digital camera 100 is capable of generating images even during communication. This discrimination processing involves, for example, sending a request for model information to the digital camera 100 when establishing a connection with the digital camera 100, and using the model information that is thereby acquired. That is, an application in the mobile phone 200 stores information on models that are capable of executing image generation in parallel to communication, and this stored model information is compared with the acquired model information. If the comparison result indicates that respective pieces of model information match, the connected digital camera 100 is discriminated as being capable of generating images even during communication. Alternatively, discrimination may be performed by acquiring and analyzing information indicating the functions of the digital camera 100. In this case, if the digital camera 100 has a function of generating images even during communication, such as a remote image capture function or a mode for automatically transmitting captured images, for example, it is judged that the digital camera 100 is capable of generating images even during communication.

If, at step S1209, the control unit 201 judges that a digital camera capable of generating images even during communication is connected, the processing proceeds to step S1210. On the other hand, if, at step S1209, the control unit 201 judges that the connected digital camera is not capable of generating images during communication, the processing proceeds to step S1211.

In steps S1210 and S1211, processing similar to that in steps S1009 and S1010 shown in FIG. 9 is executed.

The method of recording log data can be changed according to the functions of the connected camera, as described above. Appropriate matching can thereby be more efficiently performed.

Other Embodiments

The abovementioned embodiments described examples in which position information is recorded for every fixed time interval. With regard to this point, a configuration may be adopted in which position information is recorded for every fixed distance. In this case, the control unit 201 judges whether the mobile phone 200 has moved a fixed distance by comparing acquired position information with the most recent position information recorded in a log data file. Note that in the case when recording of position information ends without the mobile phone 200 moving after the recording of position information has started, the recording start will be the only point recorded in the log data file, which is not sufficient to form the body of the log data file. In view of this, when an instruction to end recording of position information is received in the case when position information is recorded every fixed distance, the log data file is closed after adding the position information recorded last time to the log data file in association with the current date and time information. Specifically, in the case when an end instruction is received at step S1004 of FIG. 9, the position information recorded the last time is added to the log data file in association with the current date and time information, before closing the log data file. Even if the recording of position information ends without the mobile phone 200 moving in the case when position information is recorded every fixed distance, it is thereby possible to record how long the mobile phone 200 was stopped at that position.

Also, the abovementioned embodiments described examples in which log data files are partitioned at the timing at which position information is added to a log data file. With regard to this point, the processing for partitioning log data files may be performed separately to the addition of position information to a log data file. That is, the addition of position information to a log data file may be configured such that the processing proceeds to step S1010 in FIG. 9, in the case of Yes at step S1006, and the processing of steps S1008 and S1009 is not performed. The mobile phone 200 then continually waits for establishment of a connection with the digital camera 100 to be detected, in parallel to the processing of FIG. 9. If it is judged that a connection has been established, the processing of FIG. 9 is interrupted, the open log data file is closed, and a recording area for an empty log data file is newly generated (opened). This empty log data file is held in an open state. That is, because there will be a log data file in an open state if an empty log data file has been newly generated, position information will be added to this empty log data file when the judgment of step S1006 is performed after the processing of FIG. 9 is subsequently resumed.

Also, the abovementioned embodiments described examples in which only closed log data files are used at the time of matching. With regard to this point, a configuration may be adopted in which a log data file that is newly generated while the mobile phone 200 is connected to a camera is not used in matching. Specifically, the control unit 201 adds and manages a unique ID for every log data file. These IDs are managed so that it is clear in which order the log data files have been recorded. For example, these IDs can be managed by adding consecutive numbers, such that the order in which the log data files are recorded will be in ascending order. When the processing of step S1109 is performed, the log data file currently being recorded is closed, a log data file is newly generated, and an ID is additionally allocated to the newly generated log data file. Furthermore, the ID of the log data file closed at step S1109 is temporarily stored in the work memory 104. At the time of matching, log data files having IDs up to the ID of the log data file temporarily stored in the work memory 104 are used in the matching. Thereby, even if, for example, the button for starting or ending acquisition of position information is selected while the device is connected to the camera 100, and a closed log data file is newly generated during connection, this log data file is not used in matching. Accordingly, more efficient matching can be performed.

Also, the abovementioned embodiments were described with examples in which position information is added to images through IDs. With regard to this point, image capture dates and times may be used instead of IDs. In this case, at step S801 of FIG. 8, for example, the control unit 201 requests image capture dates and times, instead of requesting IDs. Then, at step S803, the control unit 201 associates position information with image capture dates and times, instead of associating position information with IDs. On the other hand, the control unit 101 of the digital camera 100, having received sets in which position information is associated with image capture dates and times, specifies images to which position information is to be added, using the image capture dates and times as a key. Since ID information does not need to be additionally communicated between the mobile phone 200 and the digital camera 100, data transmission and reception can thereby be further simplified.

Also, the abovementioned embodiments were described with examples in which matching is performed in the mobile phone. With regard to this point, a configuration may be adopted in which matching is performed in the digital camera. Specifically, the mobile phone transmits position information included in a closed log data file to the digital camera 100 together with acquired dates and times corresponding to this position information. The digital camera 100, having received this information, matches the acquired dates and times corresponding to the position information included in the received log data with the image capture dates and times of images recorded on the digital camera 100. Even in this case, the use of log data generated in a period during which there are no images to which position information should be added can be prevented at the time of matching performed in the digital camera 100, enabling efficient matching to be performed.

Note that the abovementioned embodiments can also be realized by executing the following processing. That is, by software (programs) for realizing the functions of the abovementioned embodiments being supplied to a system or device via a network or any of a variety of recording media, and a computer (or a CPU, an MPU, etc.) of the system or device reading out and executing the programs.

According to the present invention, as described above, log data files can be generated in a manner that enables efficient matching to be performed.

Embodiments of the present invention can also be realized by a computer of a system or a device that reads out and executes computer executable instructions recorded on a storage medium (e.g., a non-transitory computer-readable storage medium) to perform the functions of one or more of the above-described embodiment(s) of the present invention, and by a method performed by the computer of the system or device by, for example, reading out and executing the computer executable instructions from the storage medium to perform the functions of one or more of the above-described embodiment(s). The computer may comprise one or more of a central processing unit (CPU), a micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An information processing device comprising:
a position acquisition unit configured to acquire position information periodically;
a generating unit configured to generate log data by associating each of the plurality of position information with date and time information, indicating a date and time at which the position information was acquired;
a control unit configured to control processing for establishing a connection with an image capturing device, and transmitting position information included in the log data to the image capturing device to add the position information to images recorded on the image capturing device, wherein the control unit performs control so that position information acquired after a predetermined timing, out of position information acquired during connection with the image capturing device, is not transmitted to the image capturing device; and at least one processor configured to function as at least one of the position acquisition unit, the generating unit, and the control unit, wherein the position acquisition unit acquires the position information (i) before the connection with the image capturing device is established and (ii) while the connection with the image capturing device is established.

2. The information processing device according to claim 1, wherein the predetermined timing is a timing at which the connection with the image capturing device is established, and the control unit performs control so that a connection is established by transmitting a connection permission signal in response to a connection request from the image capturing device.

3. The information processing device according to claim 1, further comprising an operation unit configured to receive an instruction to execute processing for adding position information included in the log data to images recorded on the image capturing device, wherein the predetermined timing is a timing at which the instruction is received.

4. The information processing device according to claim 1, wherein the predetermined timing is a timing at which position information, acquired after a connection with the image capturing device is established, is recorded as the log data, and the control unit performs control so that a connection is established by transmitting a connection permission signal in response to a connection request from the image capturing device.

5. The information processing device according to claim 1, wherein the image capturing device is not able to record a new image after the predetermined timing.

6. The information processing device according to claim 1, wherein the log data is handled in the form of a file, and the generating unit generates new log data when the predetermined timing arrives, by closing a log data file that is in an open state, and opening a new log data file.

7. The information processing device according to claim 6, wherein the control unit performs control so that position information, acquired after the predetermined timing, is not transmitted to the image capturing device, by performing control so that position information included in a log data file that is in an open state is not transmitted to the image capturing device.

8. The information processing device according to claim 7, further comprising a discrimination unit configured to discriminate whether the image capturing device is capable of performing image capture during communication with the information processing device, wherein if the discrimination unit discriminates that the image capturing device is capable of performing image capture during communication, the generating unit maintains the open log data file in the open state, without opening a new log data file, even when the predetermined timing arrives.

9. A method of controlling an information processing device, the method comprising:
acquiring position information periodically;
generating log data by associating each of the plurality of position information with date and time information, indicating a date and time at which the position information was acquired;
controlling processing for connecting to an image capturing device, transmitting position information included in the log data to the image capturing device, and adding the position information to images recorded on the image capturing device, wherein, in the controlling step, position information acquired after a predetermined timing, out of position information acquired during connection with the image capturing device, is not transmitted to the image capturing device; and
providing at least one processor configured to perform at least one of the acquiring step, the generating step, and the controlling step,
wherein the acquiring is performed (i) before the connection with the image capturing device is established and (ii) while the connection with the image capturing device is established.

10. A non-transitory computer-readable storage medium storing a program executable by a computer to carry out the steps of:
acquiring position information periodically;
generating log data by associating each of the plurality of position information with date and time information, indicating a date and time at which the position information was acquired;
controlling processing for establishing a connection with an image capturing device, transmitting position information included in the log data to the image capturing device, and adding the position information to images recorded on the image capturing device, wherein, in the controlling step, control is performed so that position information acquired after a predetermined timing, out of position information acquired during connection with the image capturing device, is not transmitted to the image capturing device; and
providing at least one processor configured to perform at least one of the acquiring step, the generating step, and the controlling step,
wherein the acquiring is performed before (i) the connection with the image capturing device is established and (ii) while the connection with the image capturing device is established.

11. An information processing device comprising:
a communication unit configured to establish a connection with an image capturing device;
a position acquisition unit configured to acquire position information periodically both before the connection with the image capturing device is established and while the connection with the image capturing device is established;
a control unit configured to control processing for generating log data by associating each of the plurality of position information with date and time information, indicating a date and time at which the position information was acquired; and
at least one processor configured to function as at least one of the communication unit, the position acquisition unit, and the control unit,
wherein the control unit controls processing for requesting image capture dates and times of images from the image capturing device, receiving the image capture dates and times of images without receiving the images, and transmitting position information out of the position information included in the log data, the position information to be transmitted corresponding to the image capture dates and times received from the image capturing device, and
wherein the control unit performs control so that image capture dates and times indicating dates and times after a predetermined timing are not requested.

12. The information processing device according to claim 11, wherein the control unit controls processing for receiving the image capture dates and times of the images together with identification information for specifying images, and transmits the position information corresponding to the image capture dates and times received from the image capturing device to the image capturing device together with the identification information of images corresponding to the determined position information.

13. The information processing device according to claim 11, wherein the control unit controls processing for determining the position information out of the position information included in the log data, based on the image capture dates and times received from the image capturing device and the data and time information included in the log data, and transmits the determined position information.

14. A method of controlling an information processing device, the method comprising:
   establishing a connection with an image capturing device;
   acquiring position information periodically both before the connection with the image capturing device is established and while the connection with the image capturing device is established;
   controlling processing for generating log data by associating each of the plurality of position information with date and time information, including a date and time at which the position information was acquired; and
   providing at least one processor configured to perform at least one of the establishing step, the acquiring position step, and the controlling step,
   wherein the controlling step controls processing for requesting image capture dates and times of images from the image capturing device, receiving the image capture dates and times of images without receiving the images, and transmitting position information out of the position information included in the log data, the position information to be transmitted corresponding to the image capture dates and times received from the image capturing device, and
   wherein the controlling step performs control so that image capture dates and times indicating dates and times after a predetermined timing are not requested.

15. The method of controlling an information processing device according to claim 14, wherein the controlling step controls processing for receiving the image capture dates and times of the images together with identification information for specifying images, and transmits the position information corresponding to the image capture dates and times received from the image capturing device to the image capturing device together with the identification information of images corresponding to the determined position information.

16. The method of controlling an information processing device according to claim 14, wherein the controlling step controls processing for determining the position information out of the position information included in the log data, based on the image capture dates and times received from the image capturing device and the data and time information included in the log data, and transmits the determined position information.

17. A non-transitory computer-readable storage medium storing a program executable by a computer to carry out the steps of:
   establishing a connection with an image capturing device;
   acquiring position information periodically both before the connection with the image capturing device is established and while the connection with the image capturing device is established;
   controlling processing for generating log data by associating each of the plurality of position information with date and time information, including a date and time at which the position information was acquired; and
   providing at least one processor configured to perform at least one of the establishing step, the acquiring step, and the controlling step,
   wherein the controlling step controls processing for requesting image capture dates and times of images from the image capturing device, receiving the image capture dates and times of images without receiving the images, and transmitting position information out of the position information included in the log data, the position information to be transmitted corresponding to the image capture dates and times received from the image capturing device, and
   wherein the controlling step performs control so that image capture dates and times indicating dates and times after a predetermined timing are not requested.

18. The non-transitory computer-readable storage medium according to claim 17, wherein the controlling step controls processing for receiving the image capture dates and times of the images together with identification information for specifying images, and transmits the position information corresponding to the image capture dates and times received from the image capturing device to the image capturing device together with the identification information of images corresponding to the determined position information.

19. The non-transitory computer-readable storage medium according to claim 17, wherein the controlling step controls processing for determining the position information out of the position information included in the log data, based on the image capture dates and times received from the image capturing device and the data and time information included in the log data, and transmits the determined position information.

20. An information processing device comprising:
   a communication unit configured to establish a connection with an image capturing device;
   a position acquisition unit configured to acquire position information periodically, the position acquisition unit acquiring the plurality of position information both before the connection with the image capturing device is established and while the connection with the image capturing device is established;
   a control unit configured to control processing for generating log data by associating each of the plurality of position information with date and time information indicating a date and time at which the position information was acquired; and
   at least one processor configured to function as at least one of the communication unit, the position acquisition unit, and the control unit,
   wherein the control unit controls processing for receiving image capture dates and times of images from the image capturing device without receiving the images, and transmitting position information out of the position information included in the log data, the position information to be transmitted corresponding to the image capture dates and times received from the image capturing device, and
   wherein the control unit performs control so that image capture dates and times indicating dates and times after a predetermined timing are not received.

21. The information processing device according to claim 20, wherein the control unit controls processing for receiving the image capture dates and the times of the images together with identification information for specifying images, and transmits the position information corresponding to the image capture dates and times received from the image capturing device to the image capturing device together with the identification information of images corresponding to the determined position information.

22. The information processing device according to claim 20, wherein the control unit controls processing for determining the position information out of the position information included in the log data, based on the image capture dates and times received from the image capturing device and the data and time information included in the log data, and transmits the determined position information.

23. A method of controlling an information processing device, the method comprising:
establishing a connection with an image capturing device;
acquiring position information periodically both before the connection with the image capturing device is established and while the connection with the image capturing device is established;
controlling processing for generating log data by associating each of the plurality of position information with date and time information indicating a date and time at which the position information was acquired; and
providing at least one processor configured to perform at least one of the establishing step, the acquiring position step, and the controlling step,
wherein the controlling step controls processing for receiving image capture dates and times of images from the image capturing device without receiving the images, and transmits position information out of the position information included in the log data, the position information to be transmitted corresponding to the image capture dates and times received from the image capturing device, and
wherein the controlling step performs control so that image capture dates and times indicating dates and times after a predetermined timing are not received.

24. The method of controlling an information processing device according to claim 23, wherein the controlling step controls processing for receiving the image capture dates and the times of the images together with identification information for specifying images, and transmits the position information corresponding to the image capture dates and times received from the image capturing device to the image capturing device together with the identification information of images corresponding to the determined position information.

25. The method of controlling an information processing device according to claim 23, wherein the controlling step controls processing for determining the position information out of the position information included in the log data, based on the image capture dates and times received from the image capturing device and the data and time information included in the log data, and transmits the determined position information.

26. A non-transitory computer-readable storage medium storing a program executable by a computer to carry out the steps of:
establishing a connection with an image capturing device;
acquiring position information periodically both before the connection with the image capturing device is established and while the connection with the image capturing device is established;
controlling processing for generating log data by associating each of the plurality of position information with date and time information indicating a date and time at which the position information was acquired; and
providing at least one processor configured to perform at least one of the establishing step, the acquiring position step, and the controlling step,
wherein the controlling step controls processing for receiving image capture dates and times of images from the image capturing device without receiving the images, and transmits position information out of the position information included in the log data, the position information to be transmitted corresponding to the image capture dates and times received from the image capturing device, and
wherein the controlling step performs control so that image capture dates and times indicating dates and times after a predetermined timing are not received.

27. The non-transitory computer-readable storage medium according to claim 26, wherein the controlling step controls processing for receiving the image capture dates and the times of the images together with identification information for specifying images, and transmits the position information corresponding to the image capture dates and times received from the image capturing device to the image capturing device together with the identification information of images corresponding to the determined position information.

28. The non-transitory computer-readable storage medium according to claim 26, wherein the controlling step controls processing for determining the position information out of the position information included in the log data, based on the image capture dates and times received from the image capturing device and the data and time information included in the log data, and transmits the determined position information.

* * * * *